United States Patent
Zhang et al.

(10) Patent No.: US 11,259,904 B2
(45) Date of Patent: Mar. 1, 2022

(54) DIGITAL INTEGRATED MOLDING METHOD FOR DENTAL ATTACHMENTS

(71) Applicant: CHENGDU TIANQI ADDITIVE MANUFACTURING CO., LTD., Sichuan (CN)

(72) Inventors: Zhixiao Zhang, Chengdu (CN); Ruicheng Liu, Chengdu (CN); Shanfang Zou, Chengdu (CN); Liping Wu, Chengdu (CN); Yiwei Zeng, Chengdu (CN); Xianke Deng, Chengdu (CN)

(73) Assignee: CHENGDU TIANQI ADDITIVE MANUFACTURING CO., LTD., Sichuan (CN)

( * ) Notice: Subject to any disclaimer, the term of this patent is extended or adjusted under 35 U.S.C. 154(b) by 0 days.

(21) Appl. No.: 16/969,225

(22) PCT Filed: May 22, 2018

(86) PCT No.: PCT/CN2018/087868
§ 371 (c)(1),
(2) Date: Aug. 12, 2020

(87) PCT Pub. No.: WO2019/153572
PCT Pub. Date: Aug. 15, 2019

(65) Prior Publication Data
US 2021/0000575 A1 Jan. 7, 2021

(30) Foreign Application Priority Data
Feb. 12, 2018 (CN) .......................... 201810146987.6

(51) Int. Cl.
*A61C 13/00* (2006.01)
*B22F 10/00* (2021.01)

(52) U.S. Cl.
CPC ...... *A61C 13/0004* (2013.01); *A61C 13/0018* (2013.01); *A61C 13/0019* (2013.01); *B22F 10/00* (2021.01)

(58) Field of Classification Search
None
See application file for complete search history.

(56) References Cited

U.S. PATENT DOCUMENTS 5,880,962 A * 3/1999 Andersson ......... G05B 19/4099
700/98
6,682,684 B1 * 1/2004 Jamalabad ............ B29C 64/118
264/308

(Continued)

FOREIGN PATENT DOCUMENTS

CN          1518563 A        8/2004
CN        106361455 A  *     2/2017

(Continued)

OTHER PUBLICATIONS

Machine Translation of CN-106361455-A (Year: 2017).*
Nov. 16, 2018 International Search Report issued in International Patent Application No. PCT/CN2018/087868.

*Primary Examiner* — Jacob J Cigna
(74) *Attorney, Agent, or Firm* — Rimôn, P.C.

(57) ABSTRACT

A digital integrated molding method for dental attachments includes 3D design, aiming at acquiring 3D data of an attachment itself through 3D scanning of an attachment preform, carrying out modeling design directly on the basis of acquired data, adjusting corresponding positions of an inner-crown and an attachment, or a bridge and an attachment by design software, and directly designing the attachments of the inner-crown and the bridge into a whole; data processing, aiming at slicing the integrated inner-crown and attachment or bridge and attachment for additive manufacturing; and additive manufacturing, aiming at processing an (Continued)

integrated inner-crown, bridge or attachment. The molding method can greatly improve the molding accuracy of dental attachments, and ensure the relative accuracy of inner-crowns, bridges or attachments.

10 Claims, 3 Drawing Sheets

(56) References Cited

U.S. PATENT DOCUMENTS

| | | | | |
|---|---|---|---|---|
| 7,293,988 B2* | 11/2007 | Wen | ........................ | A61C 9/002 |
| | | | | 433/24 |
| 8,185,224 B2* | 5/2012 | Powell | ................... | B33Y 50/00 |
| | | | | 700/95 |
| 8,209,044 B2* | 6/2012 | Inoue | ...................... | G06F 19/00 |
| | | | | 700/98 |
| 10,011,079 B2* | 7/2018 | Wighton | ................ | B29C 64/153 |
| 2007/0118243 A1* | 5/2007 | Schroeder | .............. | G16H 50/50 |
| | | | | 700/118 |
| 2013/0209961 A1* | 8/2013 | Rubbert | ............... | A61C 8/0077 |
| | | | | 433/175 |
| 2017/0304025 A1* | 10/2017 | Webber | .................... | A61C 7/08 |
| 2017/0319296 A1* | 11/2017 | Webber | ................. | A61C 7/146 |

FOREIGN PATENT DOCUMENTS

| | | |
|---|---|---|
| CN | 106361455 A | 2/2017 |
| CN | 106923918 A | 7/2017 |

\* cited by examiner

DIGITAL INTEGRATED MOLDING METHOD FOR DENTAL ATTACHMENTS

FIELD OF THE INVENTION

The invention relates to the field of additive manufacturing, in particular to the field of additive manufacturing of dental dentures, and specifically a digital integrated molding method for dental attachments.

BACKGROUND OF THE INVENTION

The dentition defect and loss are common clinical oral diseases, which greatly affect the oral and systemic health and living quality of patients, especially edentulous patients with severe absorption of alveolar ridge. Attachments play a good role in the partial tooth loss and in the retention and stability of complete denture, which obviously enhance the masticatory function and denture stability of patients, improve the periodontal condition, and reduce the absorption of alveolar ridge in the missing tooth area through physiological stimulation and effects of forces. Attachments are a kind of metal restorations widely used in the restoration of dentition defect at present.

The main difference between attachment denture and conventional denture is the necessity for accurate placement of an attachment. Nowadays, all kinds of attachments popular in the world are preforms, including metal preforms, plastic preforms and metal-plastic preforms. In use, a metal preform is first fixed at a predetermined position, and welded into a metal inner-crown bridge or the metal framework of a removable partial denture. Plastic preforms are mostly made of mold materials. The male and female parts of the attachment are molded together with the inner-crown bridge modeling wax or the dental framework modeling wax respectively, and are integrally embedded and cast. The metal-plastic preform is often an elastic attachment. In use, a metal male part and a metal inner-crown are welded together, and a plastic female part is fixed on the tissue surface of removable partial denture. The plastic female part contains nylon component and thus reveals certain elasticity. In order to make a precise attachment denture, the parallel grinder is required and characterized by the following three main functions: ① determining the position channel as an observer; ② calibrating the position of attachments or substitutes thereof and arranging them accurately; ③ modifying the modeling wax or grinding the metal inner-crowns according to the type of restoration, thereby making them parallel to each other or ensuring the proper angle of their axial surfaces. Usually, the attachment fixed on the abutment is made first. Then, the completed part of the attachment is tried on, the other part of the attachment (or the substitute thereof) is inserted into the completed part (or the substitute thereof), a model is infused into a whole dental arch impression, and the jaw position relationship is determined. Afterwards, the laboratory shall make the other part of attachment and denture as required.

The additive manufacturing, also known as 3D printing, makes the whole manufacturing process truly intelligent and digital by reconstructing and designing a 3D digital model and manufacturing physical parts based on the principle of layer-by-layer accumulation of metal powder. The selective laser melting technology is the most widely used based on the laser melting of metal powder. It integrates the laser technology, digital intelligent control technology, computer aided design analysis and rapid prototyping, and thus can be used directly for manufacturing metal parts with metallurgical bonding, compact structure, good mechanical properties and high precision. Also, it meets the technical requirements of individualized, complicated and highly difficult dental restoration in the current field of dental restoration, and makes up for the shortcomings of the prior art, without influences caused by casting defects. Therefore, the selective laser melting technology has been increasingly applied to the manufacture of dental restorations and evolved into an indispensable emerging technology for digital oral processing.

However, when the selective laser melting technology is used for processing metal materials, the attachment could produce thermal stress and thus deform possibly due to the forming mechanism of sudden heating and quenching during the manufacturing process. In this case, a stable and effective post processor is required to ensure the complete release of residual stress, and thus ensure that the accuracy and performance of the attachment fully meet the clinical requirements. Moreover, after the processed attachment is provided with a support for additive manufacturing, the post-processing becomes time-consuming and easily affects the accuracy of the attachment structure. So, it is very difficult to process the attachment denture by the selective laser melting technology.

SUMMARY OF THE INVENTION

The technical solution in the invention is to provide a digital integrated molding method for dental attachments, which changes the molding technology of dental attachments and improves their molding accuracy.

The invention discloses a digital integrated molding method for dental attachments, which comprises the steps of:

3D design: aiming at obtaining the data of a related part and an attachment, adjusting the relative position thereof, and designing the related part and the attachment directly as a whole;

data processing: aiming at slicing the integrated related part and attachment required for additive manufacturing; and additive manufacturing: printing the integrated related part and the attachment through additive manufacturing according to the slicing processing results.

Preferably, in the 3D design, the attachment denture is designed according to the position of attachment, shape and size of the related part; and a relative position of the related part and the attachment is determined through simulated occlusion.

Preferably, the digital integrated molding method for dental attachments further comprises the steps of:

building a database before 3D design and saving the common attachment data into the database.

Preferably, an attachment shape is obtained through blue-ray scanning in combination with tip scanning of an attachment preform, optimized and modified by a reverse design software and saved in the database.

Preferably, the attachment covered by the database includes a ball-socket attachment, a Tai Chi Button attachment and a bar clip attachment.

Preferably, during data processing, the designed integrated attachment and related part are placed on a substrate, and a support is arranged between the printed attachment and the substrate;

during additive manufacturing, the support as well as the integrated attachment and related part is printed on the substrate; and the support is removed after additive manufacturing.

Preferably, an angle support is provided for the attachment part when adding the support.

Preferably, the attachment is a ball-socket attachment, and a conical support is separately arranged at the bottom of the ball-socket structure and a breaking point is set thereon.

Preferably, the additive manufacturing adopts the selective laser melting technology, and the plane scanning includes the following area scanning:

contour scanning: scanning along the outer contour of the plane;

internal stripe scanning: scanning the stripe in the internal area of the plane;

upper skin scanning: scanning the upper skin area inside the contour line, wherein the upper skin area is located on the side of the plane close to the upper surface of the preform, and the upper skin area is located between the outer contour line and the inner area, and the width $D_1$ of the upper skin area satisfies the following relational expression:

$$D1 = ah \cdot \tan \alpha$$

where, h is the thickness of the scanning layer, a is in the range of $1 \leq a \leq 4$, $\alpha$ is an angle between the upper surface corresponding to the position of the plane and the vertical plane or the angle between its tangent plane and the vertical plane, and $\alpha$ is in the range of $0° < \alpha < 90°$;

lower skin scanning: scanning the lower skin area inside the contour line, wherein the lower skin area is located on the side of the plane close to the lower surface of the preform, and the lower skin area is located between the outer contour line and the inner area, and the width $D_1$ of the upper skin area satisfies the following relational expression:

$$D2 = bh \cdot \tan \beta$$

where, h is the thickness of the scanning layer, b is in the range of $1 \leq \alpha \leq 3$, $\beta$ is an angle between the lower surface corresponding to the position of the plane and the vertical plane or the angle between its tangent plane and the vertical plane, and $\beta$ is in the range of $0° < \alpha < 90°$;

Preferably, the laser power of contour scanning is 150 W-200 W, the scanning speed is 800 mm/s-1300 mm/s, and the diameter of laser spot is 0.07-0.11 mm;

the width of the upper skin area is 0.05-0.20 mm, the scanning laser power is 200 W-250 W, the scanning speed is 1000-1500 mm/s, and the diameter of the laser spot is 0.07-0.11 mm;

the width of the lower skin area is 0.03-0.15 mm, the scanning laser power is 150 W-200 W, the scanning speed is 1500-2000 mm/s, and the diameter of the laser spot is 0.07-0.11 mm;

the scanning laser power of the inner stripe is 200 W-250 W, the scanning speed is 1000 mm/s-1500 mm/s, and the diameter of the laser spot is 0.07-0.11 mm.

Preferably, the related part is an inner-crown or a bridge.

The beneficial effects of the invention are as follows: unlike the traditional way by which the attachment and the metal inner-crown are respectively and independently molded and then mounted and welded, the digital integrated molding method of the dental attachment of the invention adopts the integrated molding design of the inner-crown and the attachment, and achieves the integral molding through additive manufacturing; therefore, the molding precision of the dental attachment is greatly improved, the relative precision between the inner-crown and the attachment is ensured, and the attachment can better meet the requirements in details, thus improving the utilization rate of materials. An entire denture is more conducive to its stability in the later stage. In contrast to the separate molding of inner-crown, bridge and attachment, the invention has a simplified molding process of selective laser melting and more convenient post-treatment, which greatly shortens the manufacturing cycle of attachment denture and effectively improves the molding efficiency.

Figure 1:
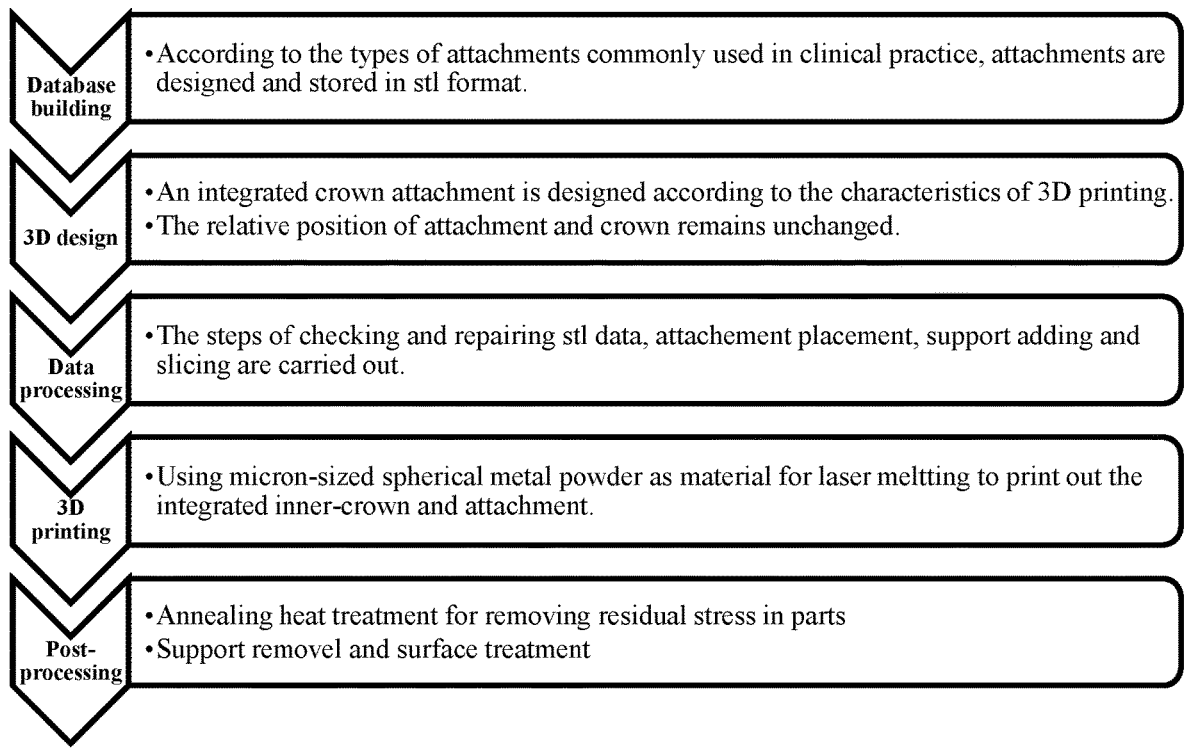
FIG. 1 is a flow chart of a preferred embodiment of the invention.
Figure 2:
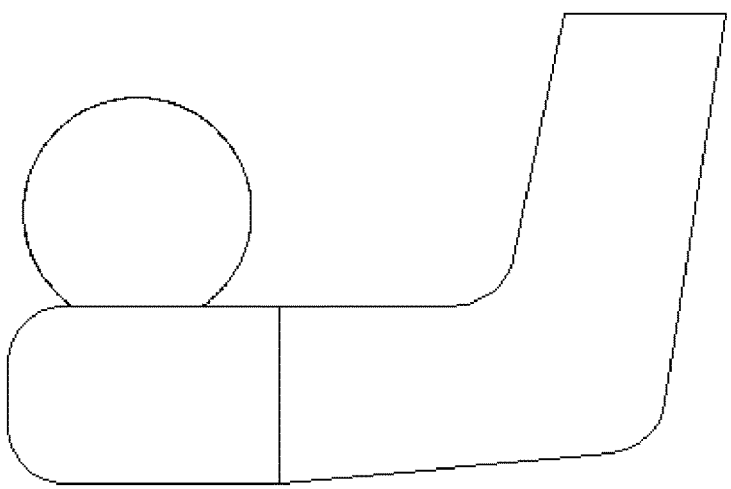
FIG. 2 is a schematic diagram of an integrated ball-socket attachment in an embodiment of the invention.

Reference numbers: angle support 1, conical support 2, breaking point 3, integrated ball-socket attachment 4.

DETAILED DESCRIPTION OF THE PREFERRED EMBODIMENT

The invention will be further described below.

The invention discloses a digital integrated molding method for dental attachments, which comprises the steps of:

3D design: aiming at obtaining the data of a related part and an attachment, adjusting the relative position thereof, and designing the related part and the attachment directly as a whole;

data processing: aiming at slicing the integrated related part and attachment required for additive manufacturing;

additive manufacturing: printing the integrated related part and the attachment through additive manufacturing according to the slicing processing results.

The related parts refer to structures connected with attachments and made of the same material in attachment dentures, among which the most common one is an inner-crown or a bridge. As mentioned in the background art, the traditional attachment should be fixed by a device like a parallel gripper in the manufacturing process, and then it is bonded to the inner-crown or bridge with wax. The digital design of the invention avoids the deviation in the process of using the gripper and wax bonding, provides an integrated attachment, inner-crown or bridge in a more accurate manner, enhances the overall toughness and strength, further improves the positioning accuracy of the attachment, and simplifies the later processing and installation procedures.

In order to ensure the actual effect of attachments, as a preferred embodiment, the attachment denture is 3D designed according to the position of attachment, shape and size of related parts, and a relative position of related parts and attachments is determined through simulated occlusion. The premise behind the design of attachment denture is that there is enough space in the mouth; that is, the space for attachment placement and for superstructure restoration in the inner-crown-root direction, which has been reserved and estimated before the relevant parts are formed. The attachment denture is designed into a whole, and a relative position of related parts and attachments is determined through simulated occlusion, so as to ensure the accuracy of the two positions, and allow the integrated related part and attachment manufactured by additive manufacturing to perfectly meet the design requirements.

The specific structure of attachment can be designed temporarily depending on the case, and selected in the conventional attachment design and modified depending on the case when necessary. Compared with the former, the latter is more efficient and practical. In order to select and call suitable attachments, a database is built before 3D design, and common attachment data is saved in it. Alternatively, regular dimensions of attachments are designed, saved in the database in a unified format file, and called at will when necessary. For example, all attachment data can be saved as general stl files. However, in fact, there is little attachment data available. In order to obtain abundant attachment data, the existing attachment preforms can be scanned by means of blue-ray scanning in combination with tip scanning to obtain 3D shapes of attachments, which are then designed, optimized and modified by reverse design software, and then saved in the database. The attachment structure in the database is not limited to one structure, and the attachments available in the database can include ball-socket attachments, Tai Chi Button attachments, bar clip attachments, which are stored as applicable.

Figure 3:
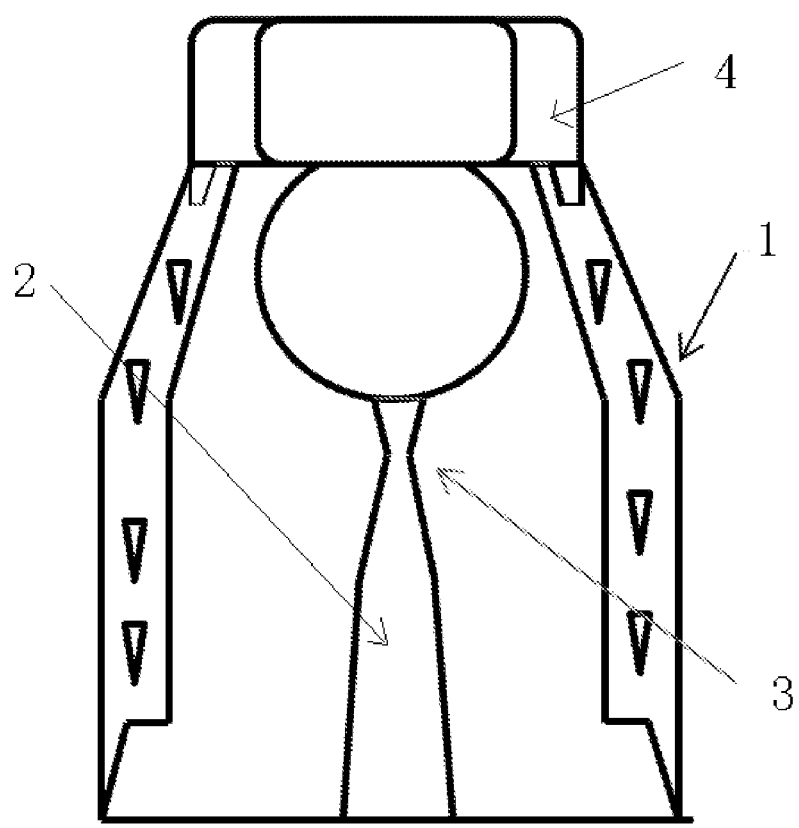
FIG. 3 is a schematic diagram showing the arrangement of an angular support and a conical support of an integrated ball-socket attachment in the invention.
Figure 4:
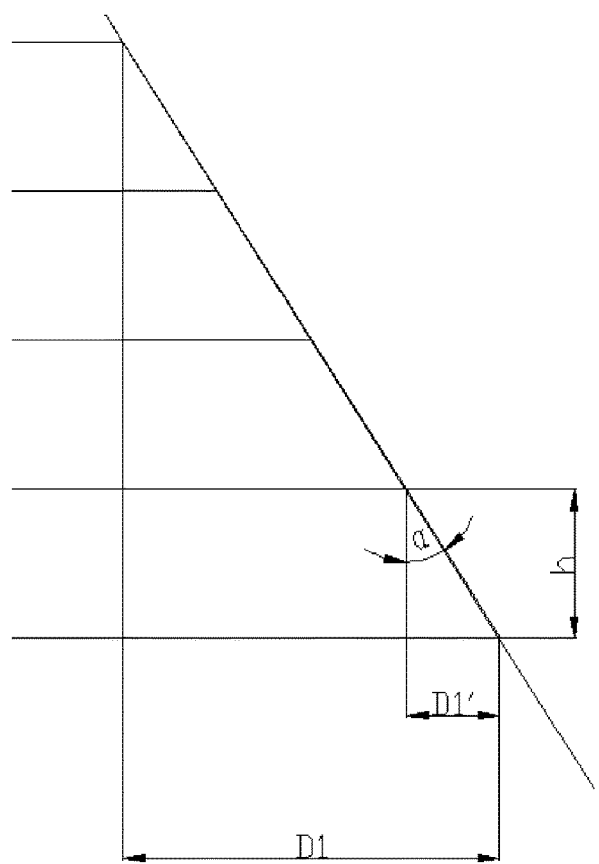
FIG. 4 is a schematic diagram of an upper skin area to be selected.

In additive manufacturing, it is usually necessary to provide the carrier of printing material that is separated after processing. If the integrated attachment and related part are printed directly on the carrier, they cannot be conveniently separated from each other, and may even cause damage to the printed attachment and related parts. To solve this problem, the designed integrated attachment and related part are placed on the substrate during data processing, and a support is arranged between the printed attachment and the substrate. In additive manufacturing, the support, integrated attachment and related part are printed on the substrate; then the support can be removed after additive manufacturing. The attachment and related part can be protected through the support added, so as not to affect their surface quality. In terms of the specific structure and position of the support, the support to be added should be able to firmly support the printed attachments, and allow the attachments to be easily removed after molding. Therefore, as a preferred embodiment, as shown in FIG. 3, an angle support 1 is provided for the attachment part when adding the support, so as to reduce the number of supports added and protect the attachment structure. In addition, the support can also be provided according to the specific structural shape of the attachment. For example, as shown in FIG. 4, when the attachment is a ball-socket attachment, a tapered support 2 is separately provided at the bottom of the ball-socket structure and a breaking point 3 is set, which is convenient for later removal and can also protect the molding quality of the ball-socket structure.

Existing additive manufacturing methods include selective laser sintering technology, selective laser melting technology and electron beam melting technology, among which the selective laser melting technology is most suitable for additive manufacturing in the invention. However, the selective laser melting technology and other additive manufacturing methods are characterized by the forming mechanism of rapid heating and quenching, which causes the attachment to produce thermal stress during the processing and become deformed possibly. For the purpose of ensuring the complete release of residual stress, the integrated attachment and related part are annealed after additive manufacturing. As shown in FIG. 1, a preferred embodiment of the invention comprehensively covers all the above steps.

The invention will be further described by way of an example of the integrated molding of the ball-socket attachment and the bottom inner-crown.

The stl file of designed ball-socket attachment is selected from the database. In the 3D design stage, the file of designed inner-crown and the file data of selected attachment are imported into Magics design software, and the attachment denture is designed according to the position of attachment, shape and size of inner-crown. The premise behind the design of attachment is that there is enough space in the mouth; that is, the space for attachment placement and for superstructure restoration in the inner-crown-root direction, which has been reserved and estimated before the inner-crown is formed. Upon the position adjustment, the relative position of attachment and inner-crown is determined, and then the inner-crown and attachment are made into a whole by software, which can be exported for the next data processing.

In the data processing stage, the designed integrated attachment and inner-crown are placed on the substrate, and it is confirmed through the repair wizard that there is no file error about the attachment and inner-crown. In the stage of support addition during data processing, it shall be ensured that the printed attachment can be firmly supported, and the attachment can be easily removed after molding. Therefore, in the stage of support addition, an angular support 1 is provided for the ball-socket structure of the integrated ball-socket attachment 4, and a conical support 2 is separately provided at the bottom of the ball-socket structure and a breaking point 3 is set, which is convenient for later removal and can also protect the forming quality of the ball-socket structure. Then, the layering is performed to complete the data processing process.

In the additive manufacturing stage, the parameters of better surface quality are selected to process the part.

In the post-processing stage, the annealing heat treatment is carried out in a muffle furnace to achieve the purpose of stress relief and ensure the strength of the ball-socket attachment, and then the integrated inner-crown and attachment are handed over to the dental processing factory to complete the subsequent manufacturing process of denture.

In case of the traditional selective laser melting processing method, the surface quality of the attachment is relatively poor, especially the surface quality of the overhanging surface is prone to step effect. Therefore, when the attachment is produced by additive manufacturing, a new scanning strategy is adopted to improve the surface accuracy of attachment, and the plane scanning includes the following area scanning:

contour scanning: scanning along the outer contour of the plane;

internal stripe scanning: scanning the stripe in the internal area of the plane;

upper skin scanning: scanning the upper skin area inside the contour line, wherein the upper skin area is located on the side of the plane close to the upper surface of the preform, and the upper skin area is located between the outer contour line and the inner area, and the width $D_1$ of the upper skin area satisfies the following relational expression:

$$D1 = ah \cdot \tan \alpha$$

where, h is the thickness of the scanning layer, a is in the range of $1 \leq a \leq 4$, $\alpha$ is an angle between the upper surface corresponding to the position of the plane and the vertical plane or the angle between its tangent plane and the vertical plane, and $\alpha$ is in the range of $0° < \alpha < 90°$;

lower skin scanning: scanning the lower skin area inside the contour line, wherein the lower skin area is located on the side of the plane close to the lower surface of the preform, and the lower skin area is located between the outer contour line and the inner area, and the width $D_1$ of the upper skin area satisfies the following relational expression:

$$D2=bh \cdot \tan \beta$$

where, h is the thickness of the scanning layer, b is in the range of $1 \leq a \leq 3$, β is an angle between the lower surface corresponding to the position of the plane and the vertical plane or the angle between its tangent plane and the vertical plane, and β is in the range of $0° < \alpha < 90°$.

Figure 5:
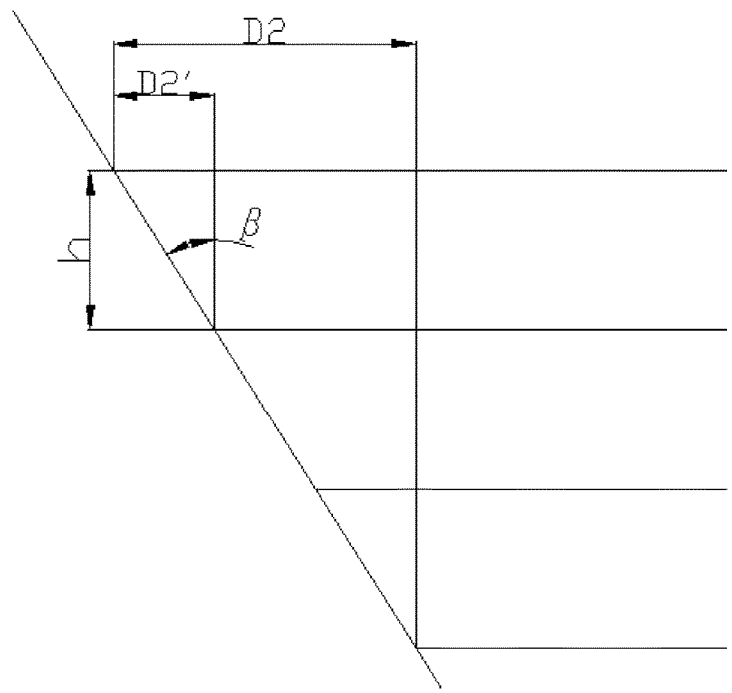
FIG. 5 is a schematic diagram of a lower skin area to be selected.

As described above, the invention scans each plane in different areas, including contour scanning, skin scanning and internal stripe scanning. The purpose of contour scanning is to improve the surface brightness, while the upper skin scanning and lower skin scanning is mainly to melt the surface structure thoroughly and obtain uniform structure. The positioning of the upper and lower skin scanning is very important and has a key impact on the quality of the two corresponding surfaces. As shown in FIG. 4, the upper skin is located on the side of the plane near the upper surface of preform, and the upper skin area is located between the external contour line and the internal area; and the upper surface here refers to the upward surface of preform after the additive manufacturing design, including an upward inclined plane, a curved surface, and the like. Similarly, the lower skin area is located on one side of the plane near the lower surface of preform and arranged between the outer contour line and the inner area; and the lower surface refers to the downward surface of preform after the additive manufacturing design, also including a downward inclined plane, a curved surface, and the like. After the upper and lower skin areas are positioned, the widths of the upper and lower skin areas need to be determined. If the skin width is too narrow or too thick, the purpose of improving the surface quality cannot be achieved. FIG. 4 shows the selection of the upper skin area, where D1' represents the minimum width of the upper skin area and D1 represents the maximum width of the upper area region. In FIG. 5, D2' represents the minimum width of the lower skin area, while D2 represents the maximum width of the lower skin area. The internal stripe scanning requires the inside of preform to be fully melted and metallurgical bonding of powders to achieve good mechanical properties. The above scanning by area can lead to good surface quality. The scanning order of the above areas can be from inside to outside or from outside to inside, but the most preferred embodiment is from inside to outside; that is, the scanning order of each area is internal stripe scanning, lower skin scanning, upper skin scanning and contour scanning in turn; or internal stripe scanning, upper skin scanning, lower skin scanning and contour scanning.

The requirements for scanning the above areas vary. For example, the lower part of the upper skin is the substrate, so the laser energy density should be high to achieve full melting with big thickness; in contrast, there is no solid in the lower part of the lower skin, so the laser energy density should be low to prevent over-melting with small thickness. With internal stripe scanning, the inside of preform should be fully melted to achieve metallurgical bonding of powders, which requires a high energy density. Meanwhile, in order to improve the processing efficiency, unidirectional scanning is adopted and the scanning angle is changed between adjacent different planes. Experiments show that the following areas can achieve the best surface quality when the following scanning parameters are used. Specific parameters are as follows:

The laser power for contour scanning is 150 W-200 W, the scanning speed is 800 mm/s-1300 mm/s, and the diameter of laser spot is 0.07-0.11 mm;

the width of the upper skin area is 0.05-0.20 mm, the scanning laser power is 200 W-250 W, the scanning speed is 1000-1500 mm/s, and the diameter of the laser spot is 0.07-0.11 mm;

the width of the lower skin area is 0.03-0.15 mm, the scanning laser power is 150 W-200 W, the scanning speed is 1500-2000 mm/s, and the diameter of the laser spot is 0.07-0.11 mm;

the scanning laser power of the inner stripe is 200 W-250 W, the scanning speed is 1000 mm/s-1500 mm/s, and the diameter of the laser spot is 0.07-0.11 mm.

Compared with the traditional scanning strategy, scanning by area described in the invention can reduce the surface roughness of the overhanging surface by 15%-20% and the upper surface roughness by 25%-30%, and greatly improve the surface quality of the attachment.

The invention claimed is:

1. A digital integrated molding method for dental attachments, comprising the steps of:
3D design: obtaining data of a related part and an attachment, adjusting the relative position thereof, and designing the related part and the attachment directly as a whole;
data processing: slicing the integrated related part and attachment required for additive manufacturing; and
additive manufacturing: printing the integrated related part and the attachment through additive manufacturing according to slicing processing results;
the additive manufacturing adopts the selective laser melting technology, and plane scanning includes the following area scanning:
contour scanning: scanning along an outer contour of a contour plane along a contour line of a preform;
internal stripe scanning: scanning the inner stripe in an internal area of the plane;
upper skin scanning: scanning an upper skin area inside the contour line, wherein the upper skin area is located on the side of the contour plane close to an upper surface of the preform, and the upper skin area is located between the outer contour line and the internal area, and width D1 of the upper skin area satisfies the following relational expression:

$$D1 = ah \cdot \tan \alpha$$

wherein, h is the thickness of the scanning layer, a is in the range of $1 \leq a \leq 4$, α is an angle between the upper surface corresponding to the position of the plane and the vertical plane or the angle between its tangent plane and the vertical plane, and α is in the range of $0° < \alpha < 90°$;
lower skin scanning: scanning a lower skin area inside the contour line, wherein the lower skin area is located on the side of the contour plane close to a lower surface of the perform, and the lower skin area is located between the outer contour line and the internal area, and width D2 of the lower skin area satisfies the following relational expression:

$$D2 = bh \cdot \tan \beta$$

wherein, h is the thickness of the scanning layer, b is in the range of $1 \leq a \leq 3$, β is an angle between the lower surface corresponding to the position of the plane and the vertical plane or the angle between its tangent plane and the vertical plane, and β is in the range of 0<β<90°.

2. The digital integrated molding method for dental attachments according to claim 1, wherein
in the 3D design, an attachment denture is designed according to the position of attachment, shape and size of the related part; and a relative position of the related part and the attachment is determined through simulated occlusion.

3. The digital integrated molding method for dental attachments according to claim 1, wherein the laser power of contour scanning is 150 W-200 W, the contour scanning speed is 800 mm/s-1300 mm/s, and the diameter of the contour scanning laser spot is 0.07-0.11 mm;
the width of the upper skin area is 0.05-0.20 mm, the upper skin area scanning laser power is 200 W-250 W, the upper skin area scanning speed is 1000-1500 mm/s, and the diameter of the upper skin area laser spot is 0.07-0.11 mm;
the width of the lower skin area is 0.03-0.15 mm, the lower skin area scanning laser power is 150 W-200 W, the lower skin area scanning speed is 1500-2000 mm/s, and the diameter of the lower skin area laser spot is 0.07-0.11 mm;
the scanning laser power of the inner stripe is 200 W-250 W, the inner stripe scanning speed is 1000 mm/s-1500 mm/s, and the diameter of the inner stripe laser spot is 0.07-0.11 mm.

4. The digital integrated molding method for dental attachments according to claim 1, wherein the related part is an inner-crown or a bridge.

5. The digital integrated molding method for dental attachments according to claim 1, further comprising the steps of:
building a database before 3D design and saving the common attachment data there into.

6. The digital integrated molding method for dental attachments according to claim 5, wherein an attachment shape is obtained through blue-ray scanning and tip scanning of the preform, optimized and modified by reverse design software and saved in the database.

7. The digital integrated molding method for dental attachments according to claim 5, wherein the attachment available in the database includes a ball-socket attachment, a Tai Chi Button attachment and a bar clip attachment.

8. The digital integrated molding method for dental attachments according to claim 1, wherein
during data processing, the designed integrated attachment and related part are placed on a substrate, and a support is arranged between the printed attachment and the substrate;
during additive manufacturing, the support as well as the integrated attachment and related part is printed on the substrate; and
the support is removed after additive manufacturing.

9. The digital integrated molding method for dental attachments according to claim 8, wherein an angle support is provided for the attachment part when adding the support.

10. The digital integrated molding method for dental attachments according to claim 8, wherein the attachment is a ball-socket attachment, and a conical support is separately arranged at the bottom of the ball-socket structure and a breaking point is set thereon.

* * * * *